Patented Apr. 19, 1938

2,114,300

UNITED STATES PATENT OFFICE 2,114,300

MOLDING COMPOSITION AND PROCESS OF MAKING SAME

Lester C. Gustin, Winchester, and Richard F. Hoflin, Cambridge, Mass.; said Hoflin assignor to said Gustin No Drawing. Application October 22, 1934, Serial No. 749,501

3 Claims. (Cl. 106—37)

This invention relates to molding compositions and the process of making and molding the same, the particular object being the production of a composition which may be used for cold molding and which has a wide application to many lines of industry.

This object is attained by the combination of certain ingredients as fully set forth in the specification which is a continuation in part of my application Serial No. 714,826, filed March 9, 1934.

One preferred form of composition is described herein, this form having been found to give satisfactory results, although it is to be understood that the various ingredients of said composition may be varied in number, characteristics, and quantities as herein described, and the invention is not limited to the precise combination of ingredients and proportions thereof except as required by the scope of the appended claims.

In manufacturing the composition four basic ingredients are used, viz: some kind of filler, a gummy adhesive, Celluloid, or a cellulose derivative and a drying oil or lubricant.

Other ingredients may be added to these basic ingredients according to the results it is desired to attain in the finished product, and the particular purposes for which the product is to be used.

The basic ingredients may also be mixed in different proportions depending upon the use to which the composition is to be put.

Regardless of the character of the filler used in the composition it is essential that some form of gummy adhesive should be incorporated therein to cause the particles of the filler covered therewith to cohere to each other under pressure, and generally it is also necessary to include a drying oil or oily liquid in the composition in order that the mixture formed by the composition will not adhere to other articles or substances.

It has been found that some of the dryer compositions are not in themselves sticky when the drying oil or lubricant is omitted and this basic ingredient can be left out in certain consistencies.

The gummy adhesive may be a solution of gums, resins, shellac, glue, rubber latex, casein, a gummy or a processed vegetable oil, all of which have been found satisfactory in some of the different kinds of compositions manufactured.

It has been found by experiment that linseed oil satisfactorily serves the purpose as a lubricating agent, but in some cases other drying oils may be used to advantage, or oily liquids may be used for a lubricant, the purpose being to produce a lubricating film in the composition to give the composition its non-adherent characteristics.

Lubricants such as graphite have been used but the best results have been obtained by oily liquids of a temporary nature that dry out or oxidize as the composition cures after molding.

By using a lubricant in the composition a mixture will be formed which will not stick to the hands, to molds, or to any other elements.

Owing to this characteristic of the finished composition it may be molded easily in a machine into any desired form.

The Celluloid must be dissolved and acetone is the best solvent for this purpose although other suitable solvents may be used.

In some cases nitro-cellulose or other cellulose derivative may be substituted for Celluloid scraps.

In making the composition a particular kind of filler is selected in accordance with the characteristics desired in the finished composition and the particular work it is intended to perform.

The inert filler can be selected from a wide range of materials some of which as as follows:

| | |
|---|---|
| Soft wood flour | Cotton flocks |
| Hard wood flour | Steel wool |
| Wood fiber | Hair |
| Leather dust | Wool |
| Leather fiber | Powdered mica |
| Paper dust | Mica flakes |
| Cotton waste | Asbestos powder |
| Clay | Asbestos fiber |
| Dextrine | Vegetable fiber |
| Whiting | Rope fiber |
| Zein | Granite dust |
| Zinc oxide | Silk fiber |

The composition may be made up and varied in accordance with many different formulas, all however having certain definite characteristics in common.

It consists of a graded, inert filler, generally with a fibrous substance included (or the fibrous filler only, may be used), united with a paste-like mass containing a gummy adhesive and scrap Celluloid or a cellulose derivative and with a lubricant in case the mixture without the addition of the lubricant is sticky, these ingredients being mixed in such proportions as to insure that the resulting composition can be molded rapidly by machine without undue adhesion to the molds during the operation.

One typical formula is as follows:

Take 84 pounds paste solution made by dissolving 21 pounds film scrap in 63 pounds acetone, place in agitator and add 24 pounds copal or manila chips which have been pulverized to the fineness of sugar and 18 pounds of wood resin which have been pulverized in the same manner, and keep this mixture in agitation until the gums have been dissolved and a binder formed.

Place the above binder mixture in a mixing machine and add an inert filler composed of 50 pounds leather fiber, 25 pounds paper dust and 25 pounds maple wood flour which have previously been uniformly mixed, the inert filler being added while the binder mixture is being kept in constant agitation.

When the binder mixture and inert filler have been thoroughly and uniformly mixed the composition is ready for molding.

If the composition is sticky a lubricating agent such as linseed oil is added until the stickiness disappears.

A slight tacky feeling is not objectionable provided the mixture does not adhere to the hands as it will disappear with aging.

The composition will be somewhat improved by aging for one or two days in air-tight receptacles.

The order of mixing as outlined above has been found to give good results but a satisfactory composition may be obtained by reversing the order of mixing and adding the binder mixture to the inert filler.

It is important to keep the liquid or paste solutions in constant agitation when adding the filler, or the filler in constant agitation when adding the liquid or paste solution.

The percentages of fillers, gummy adhesive, cellulose derivative and drying oil or lubricant varies in the different combinations according to the results desired, but, in general the variations fall within the limits given below, although these may be exceeded to obtain certain results.

| | Parts by weight |
|---|---|
| Inert fillers | 25 to 55 |
| Gummy adhesive | 2 to 25 |
| Cellulose derivative | 3 to 20 |
| Cellulose solvent | 9 to 60 |
| Gummy adhesive solvents | 2 to 25 |
| Drying oil or lubricant | 0 to 10 |

In making the composition the drying oil or lubricant varies approximately in accordance with the proportion of gummy adhesive used, it being understood that the more gummy adhesive that is used, the greater the proportion of drying oil or lubricant will be required.

In making the composition it is further understood that the less the liquid content of the composition the less will be the amount of drying oil or lubricant required until a point is reached in the dryer compositions where no drying oil or lubricant will be necessary.

Inert fillers are graded as to size, the purpose being to have the smaller particles fill in the voids between the larger particles.

To obtain brittleness, finer fillers are used.

To increase toughness fibers are used, and for extreme toughness it is essential to use fibers which have a tendency to hang together and curl up such as pulverized leather fiber, paper dust or wool.

The drying is speeded up by the use of coarser fibers, especially wood fibers.

To obtain porousness, coarser fibers only are used.

Fibers should be graded so that some, at least, should readily absorb the liquid in the binder mixture.

When non-absorbent fillers, such as steel wool or granite dust are used, they cannot be used alone, but must be combined with other fillers which will absorb the liquid in the binder mixture.

To obtain a softer texture fillers such as leather fiber, leather powder and paper dust are used.

Gummy adhesives are used to vary the hardness of the composition.

Gums and resins make the composition hard and brittle.

The greater the proportion of gums and resins used the harder the molded composition will be.

For a light, porous material, the proportion of gums and resins is decreased.

For a flexible composition a flexible glue, latex or a gummy, processed vegetable oil is used.

Celluloid scrap or a cellulose derivative is used as a binder in conjunction with the gummy adhesive and also to give toughness to the composition.

The greater the proportion of Celluloid or cellulose derivative used the tougher will be the composition.

The drying oil or lubricant is used to take the stickiness out of the composition and to form a lubricant for the molds during molding, and the quantity used varies according to the proportion of the gummy adhesive used, increasing as the amount of the gummy adhesive increases and also varies as the liquid content of the composition, decreasing with the decrease of liquid content until a point is reached where none will be required.

The composition may be characterized as being composed of discrete solid particles united with a heavy, paste-like binder from which the greater part of the liquid of the binder is absorbed into the inert filler and remains therein, the solid ingredients of the binder remaining on the particles of inert filler and forming a coating thereon resulting in a composition which is only slightly moist to the touch and is not originally nor under ordinary conditions either coherent within itself nor adherent to surrounding surfaces but which can be consolidated and made to conform to a prescribed shape by subjecting it to pressure alone.

The composition remains non-adherent under ordinary pressure, but coherency between the individual particles of filler is developed by the molding pressure, the liquid of the paste-like binder which was absorbed by the inert filler being forced to the surface of the individual particles of the filler and causing the binder coating thereon to become fluid under such pressure conditions so as to flow together and unite to form a more or less continuous matrix throughout the whole and resulting in a molded article in which the shrinkage after molding is negligible.

It has been found that inert fillers as herein specified may be united with heavy paste-like binders other than that specified herein, in such manner that the greater part of the liquid of the binder is absorbed into the inert filler and remains therein, the solid ingredients of the binder remaining on the particles of inert filler and forming a coating thereon, resulting in a composition which is only slightly moist to the touch and is not originally nor under ordinary conditions either coherent within itself nor adherent to surrounding surfaces but which can be consolidated and made to conform to a prescribed shape by subjecting it to pressure alone, it remaining non-adherent even under great pressure but coherency between the individual particles of filler being developed by the molding pressure, the liquid of the paste-like binder which was absorbed by the inert filler being forced to the surface of the individual particles of the filler and causing the binder coating thereon to become fluid under such pressure conditions so as to flow together to form a more or less continuous matrix throughout the whole.

During the manufacturing process the mix is continuously agitated while the inert filler is being added so as to assure the dissemination of the particles of inert filler throughout the mass, and ultimately develops these particles with their associated coatings of the binder as discrete entities.

It also permits the bringing together of substances which ordinarily do not unite such as rubber latex and cellulose, by continuous agitation, so that one is uniformly mingled with the other and then adding the inert filler to hold them permanently in that relationship and in such manner that the properties of each are imparted to the molding composition.

For coloring the molding composition 7 grams to 14 grams of aniline dye are used, the amount being according to the proportions of the composition to be colored, this dye being dissolved in 8 ounces of alcohol, heated to a temperature of about 100° F., and this amount of colored solution is added to 7 to 9 pounds of inert filler.

In this case the filler used must absorb the dye.

For coloring the binder mixture with which the filler is subsequently united, pigments are used which will bring the mixture to the proper color to match the color of the filler.

In molding the composition the molding mixture is placed in the loading cavity of suitably designed molds and the pressure applied either slowly or practically instantaneously by means of a quick stamping action at the rate of thirty or even more blows per minute.

It has been found that the liquid content of the composition exerts a certain influence on the molding speed, the less the liquid content, the slower will be the rate of molding.

This is due, to some extent, to the air that is impressed in the "moist powder" forms of the composition as the mold is closed, which air must be allowed to escape so that the molded object will not expand or "puff up" when the pressure is removed.

The molds for carrying out the molding operations are described in copending application Serial No. 725,488, now Patent No. 2,057,377, issued Oct. 13, 1936.

In order to eliminate the impressed air previous to the actual molding so as to speed up the molding operation, the molding composition may be pre-compressed into a slug or cartridge of any suitable shape such as a cylinder, sphere, oval, cube or similar geometrical form, such slug or cartridge containing the proper amount of composition of the loading charge for the article to be molded, and being of itself of sufficient rigidity so that it may be handled through all the operations of automatic machine molding.

The slugs or cartridges may be formed in various ways such as being forced through a die by an extruding machine, hydraulic ram, gear pump, or other device for forcing the composition to move under pressure and then being cut off to the proper length, or else they may be pre-molded into the slug or cartridge form directly by depositing the molding composition directly into a suitable cavity and then applying the proper pressure.

Both methods of forming the slugs or cartridges have given satisfactory results.

For drying the composition after molding it has been discovered that the finer ground the filler is, the slower it will dry in normal temperatures, a 2½ inch cube taking several days and sometimes ten days to two weeks or more.

It has been found, however, that by grading the finer filler with a coarser fiber that the drying time was much reduced and that by an application of heat of a temperature of 110° to 120° F. to a 2½ inch cube, using a graded filler, that the drying time could be reduced to twenty-four hours or less.

A molded object, immediately after being molded, can be dropped from a height of five feet or more onto a concrete floor without injury thereto.

The air should be kept in circulation during the drying operation.

The various ingredients may be mixed in different proportions to form a non-tacky composition which may be used for a variety of purposes.

This composition thus formed has many properties not found in other plastic compositions, some of which are as follows:

(1) By varying the ingredients and the proportions of the composition the crushing strength, after molding and drying, can be varied from 10 pounds per square inch to 20,000 pounds per square inch or more.

(2) By varying the ingredients and proportions of the composition the texture, after molding and drying, can be made to vary from a porous material as light as cork, to a dense compact material as hard as rock maple or ivory.

(3) By varying the ingredients and the proportions of the composition the structure, after molding and drying, can be made to vary from a substance as hard and brittle as concrete to a soft substance as flexible as leather.

(4) By varying the ingredients and the proportions of the composition the dielectric strength of the molded article, after drying, can be increased or decreased.

(5) In cold molding, that is, in molding the composition at normal temperatures without the application of either heat or cold to the molds, the molding pressures may vary from 100 pounds per square inch to about 20,000 pounds per square inch or more, the molding pressure being applied either slowly or practically instantaneously by means of a quick, stamping action at the rate of thirty or even more blows per minute, the required pressure for molding varying as the ingredients and the proportions of the composition are varied.

(6) In cold molding the cohesion between the individual particles of filler is developed by the molding pressure, the liquid of the paste-like binder which was absorbed by the inert filler being forced to the surface of the individual particles of the filler and causing the binder coating thereon to become fluid under such pressure conditions so as to flow together and unite to form a more or less continuous matrix throughout the whole.

The cohesion between the particles takes place by means of two distinct steps, first a direct pressure and compression, and second, by means of a flowing or rubbing action.

Direct pressure alone is not sufficient. The pressure at which the flow starts varies according as to how the ingredients and their proportions to one another are varied but are fixed for any given relationship; in general, the dryer the mixture, the higher the pressure of flow.

A composition can be restrained from flowing under pressure when the flowing point is reached by mechanical means in suitably designed molds but the flow must take place in order to complete the molding action.

(7) When in its moldable state the composition will adhere only to itself but not to any other substance.

(8) After molding and drying, the structure of the molded article is uniform, having no grain, and when surfaced will take a stain or finish uniformly.

(9) After molding and drying the composition has such properties that it can be nailed, cut, sawed, drilled, chipped or sanded.

(10) After molding and drying, the composition can be immersed in water without disintegrating and without appreciable expansion.

(11) Owing to its property of negligible expansion and contraction due to moisture content, the surface of the molded article, after drying, can be metal plated.

(12) The composition after molding and drying increases in strength with age.

(13) By use of suitable dyes and ingredients the composition can be given a uniform color throughout varying from white through the entire range of colors to a deep black.

(14) By the use of suitable pigments, dyes or similar ingredients, the composition can be given a uniform color throughout varying from a white through the entire range of colors to deep black in such manner that sanding and buffing the composition, after molding and drying, will color the molded article without the application of further surface preparations.

When the composition is placed in molds and subjected to pressure, the surplus material will be forced through openings in the molds, this movement of the material causing the flowing or rubbing action necessary to give the coherency between the various constituents of the composition.

The surplus material delivered from the molds as above described is not wasted but is collected and then placed in other molds for the production of other articles.

In other words, there is no waste of material.

Articles formed from the composition have great strength and cannot be broken easily even when subjected to heavy blows.

For example, high spindle heels to be used on ladies' shoes when made from this composition have such strength that it is unnecessary to use therein any reinforcing steel rods such as are used generally in wooded heels.

It is believed that the many advantages and uses of the invention will be understood readily without further description.

Having thus described our invention, we claim:

1. A molding composition comprising an inert porous filler and a binder including a gummy adhesive and a dissolved cellulose derivative, the ingredients of the binder being in such proportion and amount that the filler will be coated with the mixture of adhesive and cellulose and impregnated with the solvent to provide a mass of discrete, normally non-coherent granular particles capable of being molded into a solid coherent form upon the application of molding pressure.

2. A molding composition comprising an inert porous filler, and a binder including a gummy adhesive and a dissolved cellulose derivative and a lubricant, the ingredients of the binder being in such proportion and amount that the filler will be coated with the mixture of adhesive and cellulose and impregnated with the solvent to provide a mass of discrete, normally non-coherent granular particles capable of being molded into a solid coherent form upon the application of molding pressure, the lubricant serving to render the molded composition non-adhesive to the molds in which it is shaped.

3. A molding composition comprising an inert porous filler in approximately 25 to 55 parts by weight, a binder including approximately equal parts of cellulose derivative and gummy adhesive, and solvents for the gum and cellulose derivative in such proportions as to be absorbed by the filler to render the composition a non-coherent granular mass prior to molding.

LESTER C. GUSTIN.
RICHARD F. HOFLIN.